United States Patent
Kim

(10) Patent No.: US 11,904,850 B2
(45) Date of Patent: Feb. 20, 2024

(54) SYSTEM FOR AND METHOD OF RECOGNIZING ROAD SURFACE

(71) Applicant: HYUNDAI MOBIS CO., LTD., Seoul (KR)

(72) Inventor: In Sik Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 254 days.

(21) Appl. No.: 17/405,392

(22) Filed: Aug. 18, 2021

(65) Prior Publication Data

US 2022/0063603 A1 Mar. 3, 2022

(30) Foreign Application Priority Data

Aug. 25, 2020 (KR) .......................... 10-2020-0107335

(51) Int. Cl.
*B60W 30/09* (2012.01)

(52) U.S. Cl.
CPC ......... *B60W 30/09* (2013.01); *B60W 2420/42* (2013.01); *B60W 2420/52* (2013.01); *B60W 2520/28* (2013.01); *B60W 2530/18* (2013.01); *B60W 2554/4041* (2020.02); *B60W 2554/802* (2020.02)

(58) Field of Classification Search
CPC .................. B60W 40/06; B60W 30/09; B60W 2554/4041; B60W 2554/802; B60W 2420/42; B60W 2420/52; B60W 2520/28; B60W 2530/18
See application file for complete search history.

(56) References Cited

U.S. PATENT DOCUMENTS

| | | | | |
|---|---|---|---|---|
| 11,027,653 B2* | 6/2021 | Kim | ...................... | B60W 10/18 |
| 2020/0238904 A1* | 7/2020 | Kim | ...................... | B60W 50/14 |
| 2020/0254995 A1* | 8/2020 | Lee | ...................... | G01S 13/87 |
| 2020/0346654 A1* | 11/2020 | Kojo | ............... | G08G 1/096888 |
| 2021/0197829 A1* | 7/2021 | Garnault | ............... | G06V 20/58 |
| 2021/0406618 A1* | 12/2021 | Park | ...................... | G06V 10/759 |

FOREIGN PATENT DOCUMENTS

| | | | | |
|---|---|---|---|---|
| JP | 2019021029 A | * | 2/2019 | |
| KR | 10-2019-0004067 A | | 1/2019 | |
| KR | 10-2019-0064798 A | | 6/2019 | |
| WO | WO-2018141340 A1 | * | 8/2018 | ......... B60G 17/0165 |

OTHER PUBLICATIONS

Machine Translation of Gaskey's reference (WO-2018141340-A1) (Year: 2018).*
Machine Translation of Aggarwal's reference (JP-2019021029-A) (Year: 2019).*

* cited by examiner

*Primary Examiner* — Tarek Elarabi
(74) *Attorney, Agent, or Firm* — NSIP Law

(57) ABSTRACT

A system with road surface recognition includes: a signal detection unit configured to detect a vertical location signal of a preceding vehicle using a frontward-direction sensing sensor mounted in a host vehicle; a distance computation unit configured to compute a distance in a longitudinal direction between the host vehicle and the preceding vehicle, and a distance traveled by the host vehicle, in response to the vertical location signal being at or above a setting value; and an obstacle detection unit configured to detect a speeding prevention obstacle located on a road surface, based on a value of a difference between the distance traveled by the host vehicle and the distance in the longitudinal direction between the host vehicle and the preceding vehicle.

14 Claims, 2 Drawing Sheets

SYSTEM FOR AND METHOD OF RECOGNIZING ROAD SURFACE

CROSS REFERENCE TO RELATED APPLICATIONS

This application claims the benefit under 35 U.S.C. § 119(a) of Korean Patent Application No. 10-2020-0107335 filed on Aug. 25, 2020 in the Korean Intellectual Property Office, the entire disclosure of which is incorporated herein by reference for all purposes.

BACKGROUND OF THE INVENTION

Field of the Invention

The present invention relates to a system for and a method of recognizing a road surface, both of which are capable of precisely recognizing a location of a speeding prevention obstacle formed on a road surface and thus performing control in such a manner that a vehicle travels stably.

Description of the Related Art

A method of recognizing a location of a speed bump installed on a road surface is by sensing a speed bump in front of a host vehicle using a frontward-direction camera mounted in the host vehicle and thus recognizing a location of the speed bump.

In addition, another method of recognizing a location of a speed bump installed on a road surface is by predicting a location of a speed bump using GPS information of a navigation device.

Of these two methods, the method of recognizing the speed bump using the frontward-direction camera of the host vehicle has a problem in that a situation where the frontward-direction camera cannot properly recognize the speed bump occurs when a painting pattern is not sharp or when a painted state thereof is poor.

In addition, another problem occurs in that a concave-convex road surface that, unlike the speed bump, does not have a predetermined painting pattern or the like cannot be recognized using the frontward-direction camera.

Moreover, the method of recognizing the speed bump using the GPS information has a problem in that the location of the speed bump is difficult to precisely recognize because location information may be inaccurate due to a GPS error. Therefore, there is a limit in stably controlling a vehicle when an advanced driver assistance system (ADAS) and an autonomous traveling function are in operation.

The foregoing is intended merely to aid in understanding the background of the present invention and therefore should not be interpreted to admit that the present invention falls within the purview of the related art that is already known to a person of ordinary skill in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system with road surface recognition includes: a signal detection unit configured to detect a vertical location signal of a preceding vehicle using a frontward-direction sensing sensor mounted in a host vehicle; a distance computation unit configured to compute a distance in a longitudinal direction between the host vehicle and the preceding vehicle, and a distance traveled by the host vehicle, in response to the vertical location signal being at or above a setting value; and an obstacle detection unit configured to detect a speeding prevention obstacle located on a road surface, based on a value of a difference between the distance traveled by the host vehicle and the distance in the longitudinal direction between the host vehicle and the preceding vehicle.

The signal detection unit may be further configured to detect the vertical location signal using a height component of the preceding vehicle that is sensed by a 3-dimensional lidar sensor of the host vehicle or a frontward-direction camera sensor of the host vehicle.

A frontward-direction camera sensor of the host vehicle may be configured to sense a predetermined target of the preceding vehicle using the vertical location signal, and detect the vertical location signal using a value of an angle between a straight line extending to the predetermined target and a straight line extending along an axis in the longitudinal direction of the host vehicle.

The distance computation unit may be further configured to compute the distance in the longitudinal direction between the host vehicle and the preceding vehicle using any one of a frontward-direction radar sensor, a frontward-direction camera sensor, and a 3-dimensional lidar sensor.

The distance computation unit may be further configured to compute the distance in the longitudinal direction between the host vehicle and the preceding vehicle by: performing mutual compensation on a distance in the longitudinal direction between the host vehicle and the preceding vehicle, computed by a frontward-direction radar sensor and a frontward-direction camera sensor, respectively; and computing a distance resulting from the mutual compensation as a final distance in the longitudinal direction.

The distance computation unit may be further configured to compute the distance traveled by the host vehicle by multiplying a wheel speed of the host vehicle by a time for which the host vehicle has traveled.

The frontward-direction sensing sensor may be configured to compute the distance traveled by the host vehicle using a change in a value of a distance in the longitudinal direction to an arbitrary stationary object located in front of the host vehicle.

The change in the value of the distance in the longitudinal direction to the arbitrary stationary object may be computed by performing mutual compensation on a distance in the longitudinal direction between the host vehicle and the preceding vehicle, computed by a frontward-direction radar sensor and a frontward-direction camera sensor, respectively.

The obstacle detection unit may be further configured to control travel of the host vehicle according to a location of the speeding prevention obstacle and selectively provide a warning of a presence of the speeding prevention obstacle, in response to an absolute value of the difference between the distance traveled by the host vehicle and the distance in the longitudinal direction between the host vehicle and the preceding vehicle being at or below a threshold.

A location of the speeding prevention obstacle may be stored, in response to the absolute value of the difference between the distance traveled by the host vehicle and the distance in the longitudinal direction between the host vehicle and the preceding vehicle being at or below the threshold.

In another general aspect, a method with road surface recognition includes: detecting, by a controller, a vertical location signal of a preceding vehicle using a frontward-direction sensing sensor mounted in a host vehicle; computing, by the controller, a distance in a longitudinal direction between the host vehicle and the preceding vehicle, and a distance traveled by the host vehicle, in response to the vertical location signal being at or above a setting value; and detecting, by the controller, a speeding prevention obstacle located on a road surface, based on a value of a difference between the distance traveled by the host vehicle and the distance in the longitudinal direction between the host vehicle and the preceding vehicle.

The detecting of the vertical location signal may include detecting the vertical location signal using a height component of the preceding vehicle that is sensed by a 3-dimensional lidar sensor of the host vehicle or a frontward-direction camera sensor of the host vehicle.

A frontward-direction camera sensor of the host vehicle may sense a predetermined target of the preceding vehicle using the vertical location signal, and detect the vertical location signal using a value of an angle between a straight line running to the predetermined target and a straight line running along an axis in the longitudinal direction of the host vehicle.

The computing of the distance in the longitudinal direction between the host vehicle and the preceding vehicle may include computing the distance in the longitudinal direction between the host vehicle and the preceding vehicle using any one of a frontward-direction radar sensor, a frontward-direction camera sensor, and a 3-dimensional lidar sensor.

The distance in the longitudinal direction between the host vehicle and the preceding vehicle may be computed by: performing mutual compensation on a distance in the longitudinal direction between the host vehicle and the preceding vehicle, computed by a frontward-direction radar sensor and a frontward-direction camera sensor, respectively; and computing a distance resulting from the mutual compensation as a final distance in the longitudinal direction.

The computing of the distance traveled by the host vehicle may include computing the distance traveled by the host vehicle by multiplying a wheel speed of the host vehicle by a time for which the host vehicle has traveled.

The frontward-direction sensing sensor may compute the distance traveled by the host vehicle using a change in a value of a distance in the longitudinal direction to an arbitrary stationary object located in front of the host vehicle.

The frontward-direction sensing sensor may compute the change in the value of the distance in the longitudinal direction to the arbitrary stationary object by performing mutual compensation on a distance in the longitudinal direction between the host vehicle and the preceding vehicle, computed by a frontward-direction radar sensor and a frontward-direction camera sensor, respectively.

The method may further include controlling travel of the host vehicle according to a location of the speeding prevention obstacle and selectively providing a warning of a presence of the speeding prevention obstacle, in response to an absolute value of the difference between the distance traveled by the host vehicle and the distance in the longitudinal direction between the host vehicle and the preceding vehicle being at or below a threshold.

The method may further include storing a location of the speeding prevention obstacle, in response to the absolute value of the difference between the distance traveled by the host vehicle and the distance in the longitudinal direction between the host vehicle and the preceding vehicle being at or below the threshold.

Other features and aspects will be apparent from the following detailed description, the drawings, and the claims.

DETAILED DESCRIPTION OF THE INVENTION

Figure 1:
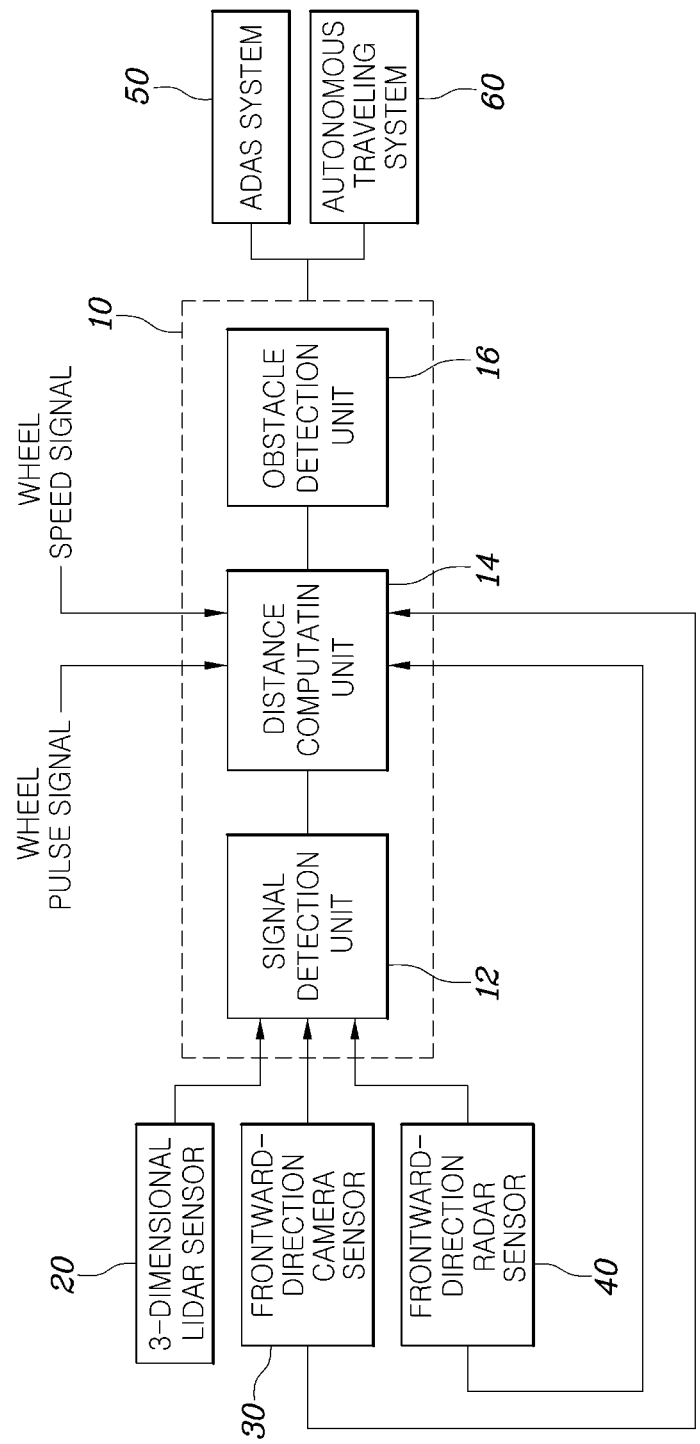
FIG. 1 is a view illustrating schematically illustrating a configuration of a system for recognizing a road surface according to the present invention.

A desired embodiment of the present invention will be described in detail below with reference to the accompanying drawings.

An embodiment of the present invention that is disclosed in the present specification or application will be described in terms of specific structures and functions for the purpose of illustration. However, the embodiment of the present invention may be practiced in various forms, and the present invention should not be construed as being limited to the embodiment described in the present specification or application.

Various modifications may be made in various ways to the embodiment of the present invention. Among these, a specific embodiment will be described in detail below with reference to the accompanying drawings. However, this description is not intended to limit the technical idea of the present invention to specifically disclosed embodiment. All alterations, equivalents, and substitutes that are included within the scope of the technical idea of the present invention should be understood as falling within the scope of the present invention.

The terms first, second, and so on may be used to describe various constituent elements, but should not be construed to impose any limitation on the meanings of the constituent elements. Those terms are only used to distinguish one constituent element from another. For example, a first constituent element may be termed a second constituent element without departing from the scope of each claim that defines the present invention. Likewise, the second constituent element may also be termed the first constituent element.

It should be understood that, when a constituent element is referred to as being "coupled to" or "connected to" a different constituent element, this means that the constituent element may be coupled to or connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween. This is true for expressions describing a relationship between constituent elements. For example, expressions such as "between" and "directly between" and expressions such as "adjacent to" and "directly adjacent to" should also be construed in the same manner.

The terms used throughout the present specification are only for describing specific embodiments and are not intended to impose any limitation on the present invention. The indefinite article "a/an" is used to mean "one or more," not only one, except as distinctively expressed in context. It should be understood that, throughout the present specification, the terms "include," "have," and the like are intended to indicate that a feature, a number, a step, an operation, a constituent element, a component, or any combination thereof is present, without precluding the presence or addition of one or more other features, numbers, steps, operations, constituent elements, or any combination thereof.

Unless otherwise defined, each of all terms used throughout the present specification, including technical or scientific terms, has the same meaning as is normally understood by a person of ordinary skill in the art to which the present invention pertains. The term as defined in commonly used dictionaries should be construed as having the same contextual meaning as that in the related art and, unless otherwise explicitly defined in the present specification, should not be construed as having an excessively implied meaning or a purely literal meaning.

FIG. 1 is a view schematically illustrating a configuration of a system for recognizing a road surface according to the present invention. The system for recognizing a road surface is configured to broadly include a signal detection unit 12, a distance computation unit 14, and an obstacle detection unit 16.

A system for recognizing a road surface according to a desired embodiment of the present invention is described with reference to the accompanying drawings. First, a signal detection unit 12 detects a vertical location signal of a preceding vehicle using a frontward-direction sensing sensor installed in a host vehicle. The preceding vehicle here may be a vehicle traveling ahead of the host vehicle on the same road.

In a case where the vertical location signal is at or above a setting value, the distance computation unit 14 computes a distance in the longitudinal direction between the host vehicle and the preceding vehicle and a distance traveled by the host vehicle.

The obstacle detection unit 16 detects a speeding prevention obstacle located on a road surface on the basis of a value of a difference between the distance traveled by the host vehicle and the distance in the longitudinal direction between the host vehicle and the preceding vehicle.

For example, the vertical location signal of the preceding vehicle is monitored by utilizing the frontward-direction sensing sensor, such as a camera, a radar, or a lidar that is used in a vehicle equipped with an advanced driver assistance system (ADAS) 50. The vertical location signal varies according to state of the road surface.

Accordingly, when the preceding vehicle travels over a speed bump, a concave-convex road surface, or the like, a fluctuation occurs in the vertical location signal, and thus the vertical location signal undergoes a great increase in amplitude. At this point, the distance in the longitudinal direction between the host vehicle and the preceding vehicle is computed, and at the same time, the distance traveled by the host vehicle is computed.

Then, the distance in the longitudinal direction between the host vehicle and the preceding vehicle and the distance traveled by the host vehicle are compared with each other, and the location of the speed bump, the concave-convex road surface, or the like that are located on the road surface is computed.

In this manner, according to the present invention, the location of the speeding prevention obstacle formed on the load surface is precisely recognized using the frontward-direction sensing sensor mounted in the host vehicle.

Therefore, when the advanced driver assistance system (ADAS) 50 and an autonomous driving system 60 operate, the host vehicle passes over the speed bump or the concave-convex road surface in cooperation with a forward collision-avoidance assist (FCA) function, a smart cruise control (SCC) function, and the like. Thus, the precaution of avoiding a risk situation that will occur due to the speed bump can be taken, and accordingly vehicle traveling control can be stably performed.

For example, if the host vehicle passes over the speed bump during braking in a state where the FCA is caused to operate immediately before the speed bump, the host vehicle behaves unstably and becomes difficult to control. Accordingly, according to the present invention, when the location of the speed bump is precisely recognized, a FCA controller may adjust a braking profile in such a manner that a braking distance is minimized and that braking is completed before passing over the speed bump. In addition, ABS and TCS operations may be prevented from deactivating the SCC function unintentionally when the host vehicle passes over the speed bump. When SCC is in operation, control may be performed in such a manner that the host vehicle passes over the speed bump smoothly.

The vertical location signal of the preceding vehicle may be detected in the signal detection unit 12 using the following methods.

As a first method of detecting the vertical location signal, the vertical location signal may be detected using a height component of the preceding vehicle that is sensed by a 3-dimensional lidar sensor 20 of the host vehicle.

As a second method, the vertical location signal may be detected using the height component of the preceding vehicle that is sensed by a frontward-direction camera sensor 30 of the host vehicle.

For example, the vertical location signal may be detected using a change in a height of a specific target portion of a rear surface of the preceding vehicle.

As a third method, the frontward-direction camera sensor 30 of the host vehicle may sense a predetermined target of the preceding vehicle using the vertical location signal, and may detect the vertical location signal using a value of an angle between a straight line running to the predetermined target and a straight line running along an axis in the longitudinal direction of the host vehicle.

For example, the vertical location signal may be detected using a change in a value of an angle between a straight line running up to an uppermost end portion of the surface of the preceding vehicle and the straight line running along the axis in the longitudinal direction of the host vehicle.

That is, in all these methods, in a case where the preceding vehicle passes over the speed bump or the concave-convex road surface, a fluctuation occurs in the vertical location signal of the target, and thus the vertical location signal undergoes an increase in amplitude.

In the distance computation unit 14, the distance in the longitudinal direction between the host vehicle and the preceding vehicle may be computed using the following methods.

As a first method, the distance in the longitudinal direction between the host vehicle and the preceding vehicle is computed using a frontward-direction radar sensor 40. That is, a value of a distance in the longitudinal direction to a specific target of the preceding vehicle that is sensed by the frontward-direction radar sensor 40 is computed, and the distance in the longitudinal direction between the host vehicle and the preceding vehicle is computed.

As a second method, the distance in the longitudinal direction between the host vehicle and the preceding vehicle is computed using a frontward-direction camera sensor 30.

That is, the value of the distance in the longitudinal direction to the specific target of the preceding vehicle that is sensed by the frontward-direction camera sensor 30 is computed, and the distance in the longitudinal direction between the host vehicle and the preceding vehicle is computed.

As a third method, the distance in the longitudinal direction between the host vehicle and the preceding vehicle is computed using the 3-dimensional lidar sensor 20. That is, the value of the distance in the longitudinal direction to the specific target of the preceding vehicle that is sensed by the 3-dimensional lidar sensor 20 is computed, and the distance in the longitudinal direction between the host vehicle and the preceding vehicle is computed.

As a fourth method, mutual complementation is performed on the distance in the longitudinal direction computed by the frontward-direction radar sensor 40 and the distance in the longitudinal direction computed by the frontward-direction camera sensor 30, and thus a distance resulting from the mutual complementation is computed as a final distance in the longitudinal direction.

For example, the distance in the longitudinal direction may be computed by supplementing and integrating respective merits and demerits of the frontward-direction radar sensor 40 and the frontward-direction camera sensor 30 through sensor fusion using a value resulting from performing sensor fusion on sensing values obtained by the frontward-direction radar sensor 40 and the frontward-direction camera sensor 30.

The distance traveled by the host vehicle may be computed in the distance computation unit 14 using the following methods.

As a first method, a distance traveled by the host vehicle may be computed by multiplying together a wheel speed of the host vehicle and the time for which the host vehicle has traveled.

For example, the distance traveled by the host vehicle may be estimated using a wheel pulse of the host vehicle and a wheel speed signal thereof and may be expressed using the following equation.

Distance traveled by the host vehicle=wheel speed [m/s] of the host vehicle×time [s] for which the host vehicle has traveled.

As a second method, the frontward-direction sensing sensor may compute the distance traveled by the host vehicle using a change in a value of the distance in the longitudinal direction to an arbitrary stationary object located in front of the host vehicle.

For example, at a point in time when the vertical location signal undergoes a great increase in amplitude, the change in the value of the distance in the longitudinal direction to the arbitrary stationary object (object, such as a traffic light, a traffic sign, or a guardrail) located adjacent to or in the vicinity of the preceding vehicle may be measured, and thus the distance traveled by the host vehicle may be computed.

Particularly, the change in the value of the distance in the longitudinal direction to the arbitrary stationary object may be computed by performing the mutual compensation on the distance in the longitudinal direction computed by the frontward-direction radar sensor 40 and the distance in the longitudinal direction computed by the frontward-direction camera sensor 30.

That is, in order to increase the precision to which the stationary object is determined, the mutual compensation may be performed on respective signals of the frontward-direction radar sensor 40 and the frontward-direction camera sensor 30, and a signal resulting from the mutual compensation may be used.

In a case where an absolute value of the difference between the distance traveled by the host vehicle and the distance in the longitudinal direction between the host vehicle and the preceding vehicle is at or below a threshold, the obstacle detection unit 16 may traveling-control the host vehicle according to the location of the speeding prevention obstacle and may selectively provide warning of the presence of the speeding prevention obstacle.

For example, in a case where a large fluctuation occurs in the vertical location signal, control is performed in such a manner that the host vehicle is caused to travel in such a manner as to stably pass over the speed bump. A driver can ensure the driving stability.

In addition, dependent on a magnitude of the fluctuation of the vertical location signal, warning of the presence of the speed bump or the concave-convex road surface may be provided to the driver, or the presence of the speed bump or the concave-convex road surface may be ignored without providing any warning.

That is, in a case where a relatively large fluctuation occurs in the vertical location signal, the warning of the presence of the speeding prevention obstacle may be provided to the driver. Furthermore, in a case where a relatively small fluctuation occurs, the warning of the presence of the speeding prevention obstacle may not be provided to the driver in order to limit excessive warnings.

Moreover, the location of the speeding prevention obstacle may be stored in the case where the absolute value of the difference between the distance traveled by the host vehicle and the distance in the longitudinal direction between the host vehicle and the preceding vehicle is at or below the threshold.

Figure 2:
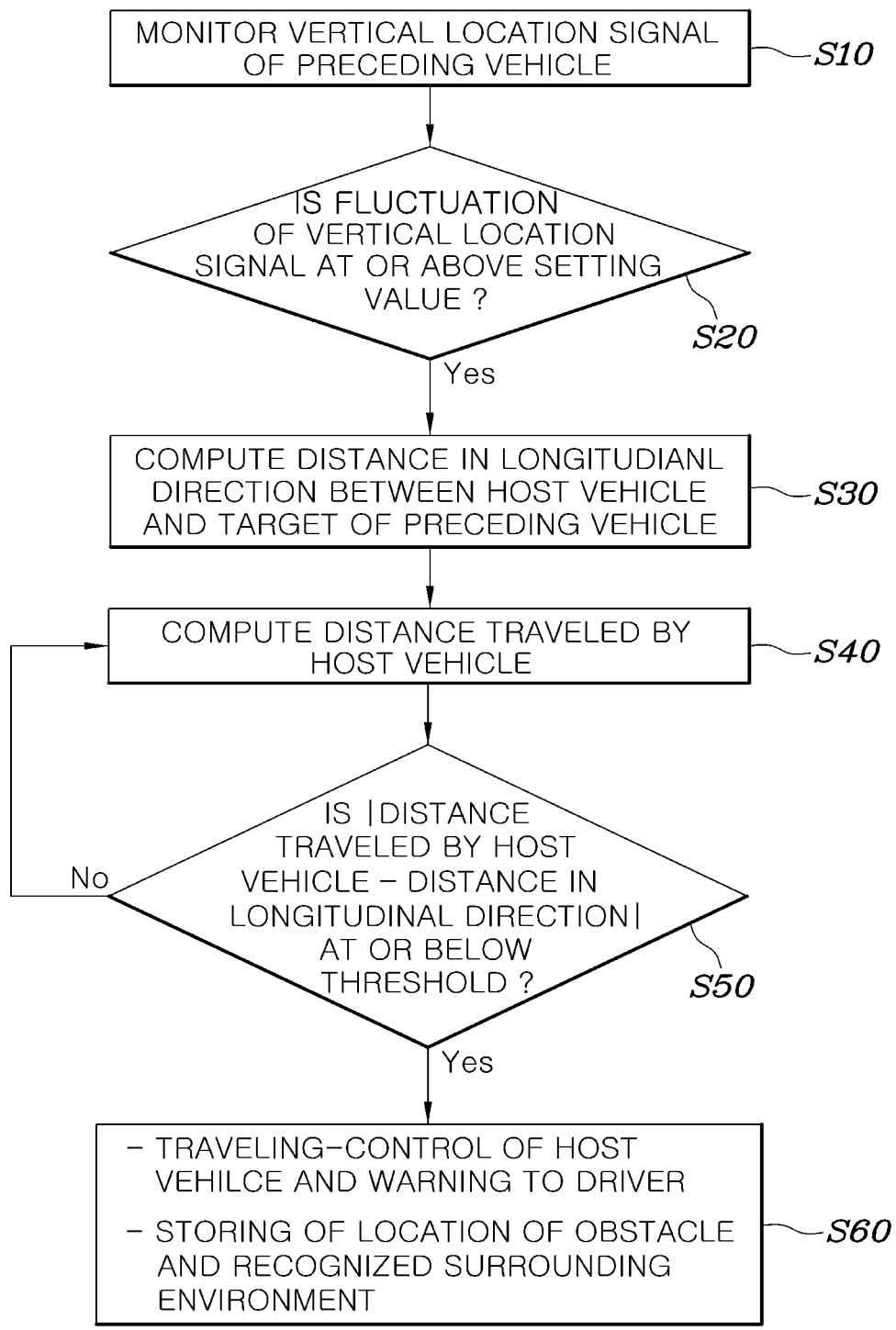
FIG. 2 is a flowchart illustrating a method of recognizing a road surface according to the present invention.

FIG. 2 is a flowchart illustrating a method of recognizing a road surface according to the present invention.

With reference to FIG. 2, the road-surface recognition method according to the present invention is configured to include a signal detection step, a distance computation step, and an obstacle detection step. In the signal detection step, a controller 10 detects a vertical location signal of a preceding vehicle using a frontward-direction sensing sensor mounted in a host vehicle. In the distance computation step, in a case where the vertical location signal is at or above a setting value, the controller 10 computes a distance in the longitudinal direction between the host vehicle and the preceding vehicle and a distance traveled by the host vehicle. In the obstacle detection step, the controller 10 detects a speeding prevention obstacle located on a road surface on the basis of a value of a difference between the distance traveled by the host vehicle and the distance in the longitudinal direction between the host vehicle and the preceding vehicle.

For reference, the controller 10 according to an exemplary embodiment may be realized through a nonvolatile memory (not illustrated) and a processor (not illustrated). The nonvolatile memory is configured to store data on an algorithm configured to control operation of each of various components of a vehicle, or on a software command generating the algorithm. The processor is configured in such a manner as to perform operations described below using the data stored in the memory. The memory and the processor may be realized as individual chips. Alternatively, the memory and the processor may be realized as a single integrated chip. The processor may be configured as a plurality of processors.

The method of recognizing a road surface is described with reference to FIG. 2.

A specific target portion of a preceding vehicle is sensed, and a vertical location signal of the preceding vehicle is monitored while a host vehicle that is a vehicle equipped with ADAS or an autonomous vehicle travels, using a frontward-direction sensing sensor mounted in the host vehicle (S10).

Subsequent to the monitoring step S10, it is determined whether or not fluctuation of the vertical location signal is at or above a setting value (S20).

In a case where a result of the determination in Step S20 is that due to the presence of a speeding prevention obstacle, the vertical location signal is at or above the setting value, a distance in the longitudinal direction between the host vehicle and the preceding vehicle is computed using the frontward-direction sensing sensor mounted in the host vehicle (S30).

Subsequently, after a point in time when the fluctuation of the vertical location signal is at or above the setting value, a distance traveled by the host vehicle is computed using a wheel pulse of the host vehicle, a wheel speed thereof, or the like, or using a distance to a stationary object in the vicinity of the preceding vehicle (S40).

Subsequently, it is determined whether or not an absolute value of a difference in the longitudinal direction between the distance traveled by the host vehicle and the distance in the longitudinal direction of the host vehicle and the preceding vehicle is at or below a threshold (S50).

Subsequently, in a case where a result of the determination in Step S50 is that the absolute value is at or below the threshold, an ADAS function of the host vehicle is performed according to a location of the speeding prevention obstacle, or an autonomous traveling function thereof is performed (S60).

At this point, the warning of the presence of the speeding prevention obstacle may be provided to the driver, and the location of the speeding prevention obstacle may be stored in a controller 10.

As described above, according to the present invention, the location of the speeding prevention obstacle formed on the road surface may be precisely recognized, and the advanced driver assistance system (ADAS) 50 and the autonomous driving system 60 operates according to the location of the speed bump or the concave-convex road surface. Thus, the precaution of avoiding the risk situation that will occur due to the speed bump can be taken, and accordingly the vehicle traveling control can be stably performed.

Only the specific embodiment of the present invention are described in detail, but it is apparent to a person of ordinary skill in the art that various modifications and alterations are possible within the scope of the technical idea of the present invention. Of course, these modifications and alterations also fall within the scope of the following claims.

With the system for and the method of recognizing a load surface according to the present invention, the location of the speeding prevention obstacle formed on the road surface is precisely recognized using the frontward-direction sensing sensor mounted in the host vehicle, and thus the advanced driver assistance system (ADAS) function and the autonomous traveling function are performed according to the location of the speed bump or the concave-convex road surface. Thus, the precaution of avoiding a risk situation that will occur due to the speed bump can be taken, and accordingly, vehicle traveling control can be stably performed.

What is claimed is:

1. A system with road surface recognition, the system comprising:
a processor configured to:
determine a vertical location signal of a preceding vehicle using a frontward-direction sensing sensor mounted in a host vehicle;
calculate a distance in a longitudinal direction between the host vehicle and the preceding vehicle, and a distance traveled by the host vehicle, in response to the vertical location signal being at or above a setting value;
detect a speeding prevention obstacle located on a road surface, based on a value of a difference between the distance traveled by the host vehicle and the distance in the longitudinal direction between the host vehicle and the preceding vehicle;
compute the distance traveled by the host vehicle using a change in a value of a distance in the longitudinal direction to an arbitrary stationary object located in front of the host vehicle;
control travel of the host vehicle according to a location of the speeding prevention obstacle;
selectively provide a warning of a presence of the speeding prevention obstacle; and
store a location of the speeding prevention obstacle, in response to an absolute value of the difference between the distance traveled by the host vehicle and the distance in the longitudinal direction between the host vehicle and the preceding vehicle being at or below a threshold.

2. The system of claim 1, wherein the processor is further configured to detect the vertical location signal using a height component of the preceding vehicle that is sensed by a 3-dimensional lidar sensor of the host vehicle or a frontward-direction camera sensor of the host vehicle.

3. The system of claim 1, wherein a frontward-direction camera sensor of the host vehicle is configured to sense a predetermined target of the preceding vehicle using the vertical location signal, and
wherein a vertical location change of the preceding vehicle is detected using a value of an angle between a straight line extending to the predetermined target and a straight line extending along an axis in the longitudinal direction of the host vehicle.

4. The system of claim 1, wherein the processor is further configured to compute the distance in the longitudinal direction between the host vehicle and the preceding vehicle using any one of a frontward-direction radar sensor, a frontward-direction camera sensor, and a 3-dimensional lidar sensor.

5. The system of claim 1, wherein the processor is further configured to compute the distance in the longitudinal direction between the host vehicle and the preceding vehicle by:
performing mutual compensation on a distance in the longitudinal direction between the host vehicle and the preceding vehicle, computed by a frontward-direction radar sensor and a frontward-direction camera sensor, respectively; and
computing a distance resulting from the mutual compensation as a final distance in the longitudinal direction.

6. The system of claim 1, wherein the processor is further configured to compute the distance traveled by the host vehicle by multiplying a wheel speed of the host vehicle by a time for which the host vehicle has traveled.

7. The system of claim 1, wherein the change in the value of the distance in the longitudinal direction to the arbitrary stationary object is computed by performing mutual compensation on a distance in the longitudinal direction between the host vehicle and the preceding vehicle, computed by a frontward-direction radar sensor and a frontward-direction camera sensor, respectively.

8. A method for road surface recognition, the method comprising:
- determining, by a controller comprising a processor, a vertical location signal of a preceding vehicle using a frontward-direction sensing sensor mounted in a host vehicle;
- computing, by the controller, a distance in a longitudinal direction between the host vehicle and the preceding vehicle, and a distance traveled by the host vehicle, in response to the vertical location signal being at or above a setting value;
- detecting, by the controller, a speeding prevention obstacle located on a road surface, based on a value of a difference between the distance traveled by the host vehicle and the distance in the longitudinal direction between the host vehicle and the preceding vehicle;
- controlling travel of the host vehicle according to a location of the speeding prevention obstacle;
- selectively providing a warning of a presence of the speeding prevention obstacle; and
- storing, in response to an absolute value of the difference between the distance traveled by the host vehicle and the distance in the longitudinal direction between the host vehicle and the preceding vehicle being at or below a threshold,
- wherein the frontward-direction sensing sensor computes the distance traveled by the host vehicle using a change in a value of a distance in the longitudinal direction to an arbitrary stationary object located in front of the host vehicle.

9. The method of claim 8, wherein the detecting of the vertical location signal comprises detecting the vertical location signal using a height component of the preceding vehicle that is sensed by a 3-dimensional lidar sensor of the host vehicle or a frontward-direction camera sensor of the host vehicle.

10. The method of claim 8, wherein a frontward-direction camera sensor of the host vehicle senses a predetermined target of the preceding vehicle using the vertical location signal, and
wherein the method further comprises detecting a vertical location change of the preceding vehicle using a value of an angle between a straight line running to the predetermined target and a straight line running along an axis in the longitudinal direction of the host vehicle.

11. The method of claim 8, wherein the computing of the distance in the longitudinal direction between the host vehicle and the preceding vehicle comprises computing the distance in the longitudinal direction between the host vehicle and the preceding vehicle using any one of a frontward-direction radar sensor, a frontward-direction camera sensor, and a 3-dimensional lidar sensor.

12. The method of claim 8, wherein the distance in the longitudinal direction between the host vehicle and the preceding vehicle is computed by:
- performing mutual compensation on a distance in the longitudinal direction between the host vehicle and the preceding vehicle, computed by a frontward-direction radar sensor and a frontward-direction camera sensor, respectively; and
- computing a distance resulting from the mutual compensation as a final distance in the longitudinal direction.

13. The method of claim 8, wherein the computing of the distance traveled by the host vehicle comprises computing the distance traveled by the host vehicle by multiplying a wheel speed of the host vehicle by a time for which the host vehicle has traveled.

14. The method of claim 8, wherein the frontward-direction sensing sensor computes the change in the value of the distance in the longitudinal direction to the arbitrary stationary object by performing mutual compensation on a distance in the longitudinal direction between the host vehicle and the preceding vehicle, computed by a frontward-direction radar sensor and a frontward-direction camera sensor, respectively.

* * * * *